US008073655B2

(12) United States Patent
Chen et al.

(10) Patent No.: US 8,073,655 B2
(45) Date of Patent: Dec. 6, 2011

(54) QUANTIFYING THE IMPACT OF NETWORK LATENCY ON THE END-TO-END RESPONSE TIME OF DISTRIBUTED APPLICATIONS

(75) Inventors: Shuyi Chen, Urbana, IL (US); William Sanders, Mahomet, IL (US); Matti Hiltunen, Chatham, NJ (US); Kaustubb Joshi, Scotch Plains, NJ (US); Richard Schlichting, New Providence, NJ (US)

(73) Assignees: AT&T Intellectual Property II, L.P.; The Board of Trustees of The University of Illinois, a body corporate and politic of The State of Illinois

( * ) Notice: Subject to any disclaimer, the term of this patent is extended or adjusted under 35 U.S.C. 154(b) by 316 days.

(21) Appl. No.: 12/321,623

(22) Filed: Jan. 23, 2009

(65) Prior Publication Data

US 2010/0191505 A1 Jul. 29, 2010

(51) Int. Cl.
*G06F 11/30* (2006.01)
(52) U.S. Cl. ........................................ 702/182; 702/186
(58) Field of Classification Search .................. 702/182, 702/186
See application file for complete search history.

(56) References Cited

U.S. PATENT DOCUMENTS

| | | | | |
|---|---|---|---|---|
| 4,972,412 A * | 11/1990 | Satoh | ............................ | 714/724 |
| 5,459,837 A * | 10/1995 | Caccavale | ..................... | 709/226 |
| 5,664,106 A * | 9/1997 | Caccavale | ..................... | 709/224 |
| 5,964,867 A * | 10/1999 | Anderson et al. | ............. | 712/219 |
| 7,278,105 B1 * | 10/2007 | Kitts | .............................. | 715/736 |
| 2005/0193113 A1 * | 9/2005 | Kokusho et al. | .............. | 709/225 |
| 2005/0210262 A1 * | 9/2005 | Rolia et al. | ..................... | 713/182 |
| 2007/0073873 A1 * | 3/2007 | Levy et al. | ..................... | 709/224 |
| 2009/0154350 A1 * | 6/2009 | Diab et al. | ..................... | 370/235 |

OTHER PUBLICATIONS

Sampling Theorem and Nyquist Rate, eFunda, http://www.efunda.com/designstandards/sensors/methods/dsp_nyquist.cfm.*
S. Chen, K. Joshi, M. Hiltunen, W. Sanders, and R. Schlichting. Transaction Dependency Graph Construction Using Signal Injection. In DSN 2007, Supplemental Volume, 2007.*
S. Agarwala, F. Alegre, K. Schwan, and J. Mehalingham. E2EProf: Automated End-to-End Performance Management for Enterprise Systems. In Proceedings of the IEEE/IFIP International Conference of Dependable Systems and Networks (DSN), Jun. 2007.*
S. Chen, Link Gradients: Predicting the Impact of Link Latency on Multi-Tier Applications, 2008, University of Illinois at Urbana-Champaign.*

* cited by examiner

*Primary Examiner* — Drew A Dunn
*Assistant Examiner* — Timothy H Hwang
(74) *Attorney, Agent, or Firm* — Henry T. Brendzel

(57) ABSTRACT

A method for measuring system response sensitivity, using live traffic and an analysis that converts randomly arriving stimuli and reactions to the stimuli to mean measures over chosen intervals, thereby creating periodically occurring samples that are processed. The system is perturbed in a chosen location of the system in a manner that is periodic with frequency p, and the system's response to arriving stimuli is measured at frequency p. The perturbation, illustratively, is with a square wave pattern.

2 Claims, 2 Drawing Sheets

QUANTIFYING THE IMPACT OF NETWORK LATENCY ON THE END-TO-END RESPONSE TIME OF DISTRIBUTED APPLICATIONS

BACKGROUND

This pertains to responsiveness of systems and, more particularly, to the measurement of the sensitivity of a system's responsiveness to changes in attributes of elements that make up the system. Advantageously, the measurement may be made while the system is in normal operation mode.

Many systems exist whose normal operation involves responding to stimuli, such as requests to do something, where the stimuli are substantially random. One example of such systems is network-based applications where users connect to a network and enter a request that may require numerous hardware devices to participate in order to satisfy the request. Those may be geographically dispersed devices that are interconnected through a network, for example, the world-wide-web (www) IP network, and they interact with each other through network links. Those devices, together with the links that interconnect them, are elements of a network-based system. Such a system differs from non-network-based systems in that the links that interconnect the elements are shared with other users of the network that have nothing to do with the system.

In the context of this disclosure, the term "link" without the qualifier "physical" refers to the logical connection from component A to component B. Such a logical connection typically comprises routers and physical links that interconnect the routers. Link latency is a measure of the delay that a message which is sent out by component A experiences as it flows to its component B destination via the link between components A and B.

Network-bases systems that provide network-based applications are becoming quite prevalent. Their proliferation makes it increasingly important to be able to predict and control responsiveness. Unfortunately, the complexity inherent in current software, hardware, and network architectures makes this task extremely difficult. For example, an enterprise application structured as a multi-tier architecture may involve complicated collections of interconnected and replicated web servers, application servers, and databases, not to mention load balancers, firewalls, routers and physical links. Other aspects of modern enterprise practices only exacerbate the problems. For example, an application may be running on a third party platform in remote hosting centers or on hardware that is shared in a utility model using virtualization technology. All of these factors make it virtually impossible to even detect all the dependencies that affect the end-to-end performance of a system (i.e., availability of a distributed application as seen by the end user); much less manage them. Without such information, it is difficult to predict the ultimate effect of, for example, moving a function to another machine, upgrading a network link, or replicating a server for increased availability.

In many applications the typical interaction is a request that triggers a response. The responsiveness of a network-based system to requests depends on many parameters, such as network topology, bandwidth, link latency, and processing resources; but it is generally considered that link latency is one of the more important attributes, especially if some of the links span wide area networks.

While this invention is generally directed to measurement of sensitivity of a system's responsiveness to changes in attributes of elements that make up the system, for illustrative purposes the following focuses on the task of measuring the sensitivity of a network-based system's end-to-end response time to changes in a link's latency.

Measuring the dependency of a system's responsiveness to link latency is not easy. Simply measuring a link's latency is not enough, because two components that communicate over a link that is characterized by high-latency may not have a large impact on the overall response time of an application if, for example, the communication over that link is required only for a small fraction of the user requests. Clearly, therefore, it is necessary to take into account the relationship between the inputs applied to the system and how the link under consideration affects the system's responsiveness. Randomness of the particular requests that appear at the system's inputs, and randomness in the arrival times of these requests make it extremely difficult to establish this relationship in any form that permits analysis.

An article by A. Brown, et al, "An active approach to characterizing dynamic dependencies for problem determination in a distributed environment," Proc. of the 7th IPIF/IEEE International Symposium on Integrated Network Management pages 377-390, May 2001, introduces a dependency determination based on active perturbation of system components and observation of their effects. System dependencies are modeled as a directed acyclic graph where nodes are the system components and weighted edges represent dependencies. An edge is drawn from component A to component B if the failure of component B can affect component A. The weight of the edge represents the impact of the failure's effect on A. While the described approach is generic in a sense, the experiment that the article describes employs periodic database table locking (effectively a failure to respond) as the perturbation method.

In an article titled "Dependency analysis in distributed systems using fault injection: Application to problem determination in an e-commerce environment," Proc. of the 12th International Workshop on Distributed Systems: Operations & Management, October 2001, S. Bagchi, et al employ the same approach in combination with fault injection as the perturbation method, and Candea et al in "Automatic failure-path inference: A generic introspection technique for Internet applications," Proc. of the 3rd IEEE Workshop on Internet Applications (WIAPP), June 2003, describe an Automatic Failure-Path Interference (AFRI) technique that combines pre-deployment failure injection with runtime passive monitoring.

Generalizing, it can be said that the above articles describe an approach for identifying relationships. They tell whether a failure in component A has an effect at component B. None of the above, however, provides a measure of the sensitivity of an application to changes of some attribute, such as link latency, and none of the above deal with injected changes that induce a measure of degradation short of a failure.

SUMMARY

An advance in the art is realized with an approach where system response sensitivity is measured by use of live traffic, with an analysis that converts randomly arriving stimuli and reactions to the stimuli to mean measures over chosen intervals, thereby creating periodically occurring samples that are processed. One set of these samples is the set of mean response measure, such as mean response time, to the arriving stimuli. A further advance in the art is realized by perturbing the system in a manner that is periodic with frequency p, and assessing response measure at frequency p. The perturbation, illustratively, is with a square wave pattern.

DETAILED DESCRIPTION

Figure 1:
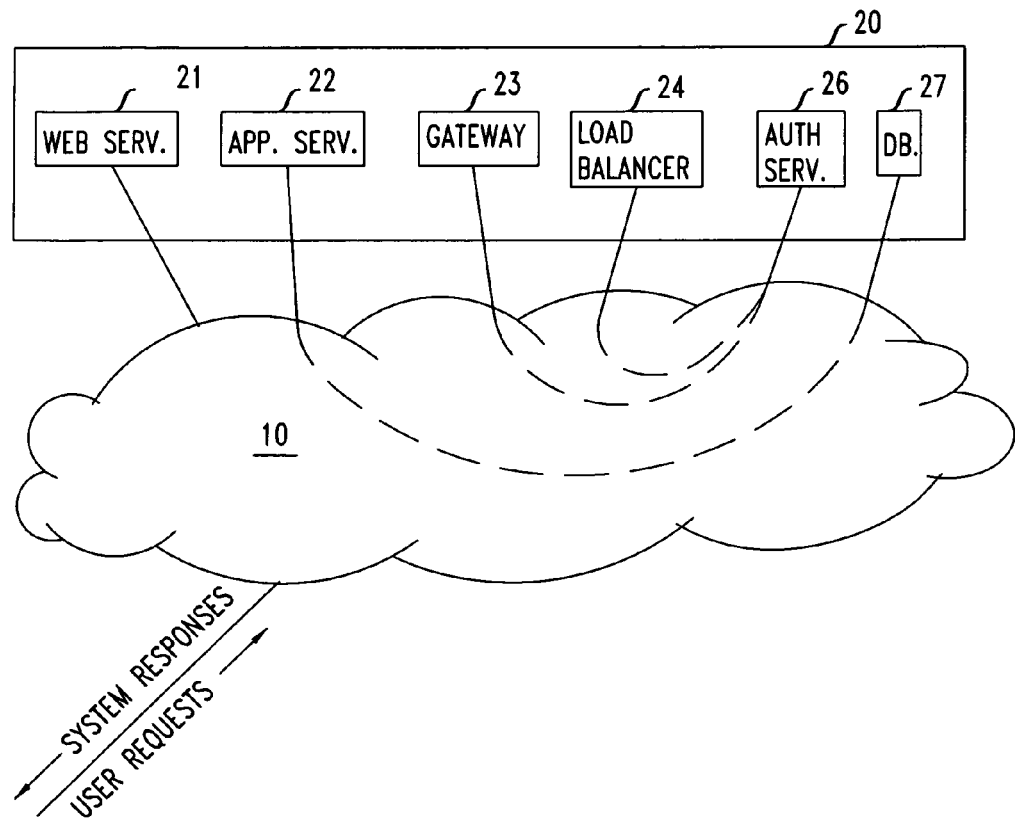
FIG. 1 depicts a network-based application in which the principles of this invention may be practiced.

In the context of a network-based application shown in FIG. 1, as outlined above, a system 20 provides a network-based application through an arrangement that includes a variety of components. The system illustrated in FIG. 1 comprises a gateway 23 to where all incoming requests are directed, load balancer 24, web server 21, application server 22, authentication server 26, and database unit 27. The devices of system 20 may be geographically dispersed and, as depicted, all of the devices communicate with each other through network 10 links (partially illustrated in FIG. 1 with a dashed line connection between devices 22 and 27, and a dashed line connection between devices 23 and 26). Of course, it is quite possible for some of the elements to communicate with each other via a local area network (if they are reasonably co-located), or via a wide area network other than network 10.

System 20 may be fairly complex in its structure and in the nature of the interactions between the elements. It is made even more complex by the fact that the physical links and the routers between the links that make up the logical links of the system are also used by network 10 in connection with traffic that has nothing at all to do with system 20. Thus, the system's responsiveness depends on the nature of the requests that users submit to the system, the attributes of arrivals of those requests, and other traffic of network 10. At least the latter two (if not all three) are, to a significant extent, random variables.

As indicated above, it is generally considered that link latency is one of the more important attributes that pertain to system responsiveness and, therefore, the disclosure below focuses on link latency and, more particularly, on change in responsiveness due to changes in link latency, i.e., link latency gradient.

What is needed is a method for measuring responsiveness of a system such as link latency gradient while taking cognizance of the above-mentioned randomness; that is, a measurement method is needed that can be employed while the system is operating in its normal mode. Advantageously, whatever measuring scheme is applied, it should not significantly affect the performance of the system to which it is applied (both for the sake of not adversely affecting the system's responsiveness to live traffic and for the sake of not affecting the validity of the measurements).

On first blush it would seem that computing the link latency gradient is simple. Some arbitrary time interval can be selected, arriving requests can be noted, and the delays that are experienced before responses to those requests arrive can be determined. Then, a delay of $\Delta l_i = A_d$ can be injected into the link under consideration, the response times can be again determined, and a simple computation would yield the gradient. Alas, the response time is affected by a number of factors, and described above, and the random variations in the response time due to these factors result in the above-described method to be less than ideal.

The following discloses a unique approach that is based on injection of perturbations in the time domain and assessment of the effects of those perturbations in the frequency domain. More particularly, the injected perturbations in the link's latency are chosen to contain a periodic component, and the assessment is made at the frequency of this periodic component. This solution arises from our realization that while the system's response time contains significant variability, as mentioned above, it is likely to contain no periodicity if none is present in the arriving requests and, consequently, injecting change in a periodic manner allows effective determination of the effect of the injected signal.

To assess the effect of the injected perturbation in the frequency domain it is convenient to start with periodically sampled signals in the time domain. The arrival times of requests during normal system operation are random, however, so one needs to convert these randomly arriving requests into something that is periodic. In accord with the principles of this disclosure, an a priori process is carried out to generate a histogram of the arrival times of requests that are submitted to the system and, based on that histogram, a time interval $\Delta T_s$ is selected during which, with a chosen degree of confidence (e.g., with a 0.999 degree of confidence), one or more requests will arrive. Once this time interval is identified and selected, it is a simple matter to determine the response times to requests that arrive during a $\Delta T_s$ interval and to compute a mean response time for the interval. Thus, a train of samples $\bar{r}t_m$ is created, where each sample has a value that corresponds to the mean response time to requests arriving during the interval $\Delta T_s$ and the train of samples is periodic in $\Delta T_s$. Relative to the latency of a link $c_i$, it can be said that the train of samples is $\bar{r}t_m(l_i)$.

When a perturbation in the latency $l_i$ of link $c_i$ is introduced, the mean response samples $\bar{r}t_m(l_i+\Delta l_i)$ can be approximated in terms of the samples without the perturbations, $\bar{r}t_m(l_i)$, by use of the Taylor expansion $$\bar{r}t_m(l_i+\Delta l_i) \approx \bar{r}t_m(l_i) + \nabla \bar{r}t_i \cdot \Delta l_i + O(\Delta l_i^2), \qquad (1)$$

where $\nabla \bar{r}t_i$ is the latency gradient of link $c_i$; i.e., $$\frac{\partial \bar{r}t(l_i)}{\partial l_i}.$$

This formulation assumes that the mean response time (as a function of link latency) does not have any discontinuities. Equation (1) can be simplified to $$\bar{r}t_m(l_i+\Delta l_i) = \bar{r}t'_m(l_i) = \bar{r}t_m(l_i) + \nabla \bar{r}t_i \cdot \Delta l_i \qquad (2)$$

if the system's response in the neighborhood of $\bar{r}t_m(l_i)$ is linear or if $\Delta l_i$ is small. Although there are notable exceptions, it can be demonstrated that many systems have continuous linear relationships (as long as $\Delta l$ is reasonable, no timeouts are triggered due to the changing latencies, and the system is not heavily loaded).

Figure 2:
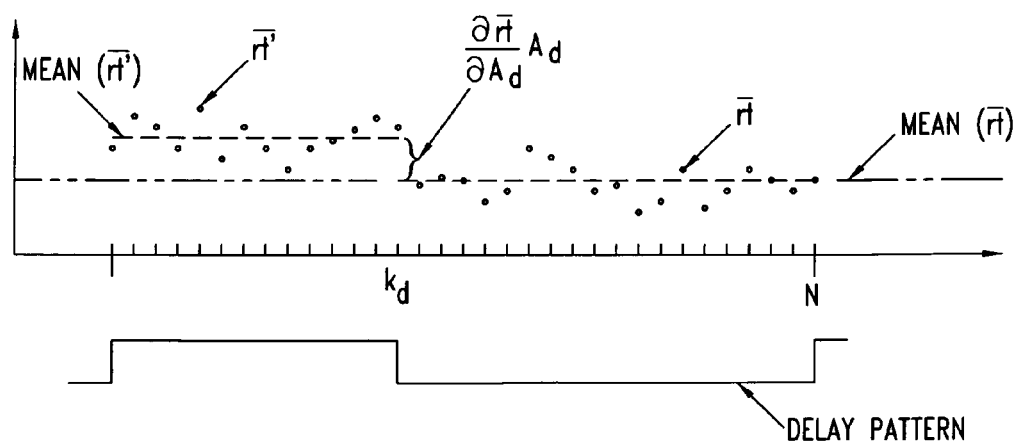
FIG. 2 depicts a step-wise input delay pattern and corresponding delays in output.

Based on the above, in accord with one implementation, a square-wave pattern of delay is employed, where for $k_d$ intervals (of duration $\Delta T_s$) a delay of magnitude $A_d$ is injected, and for the next $k_d$ intervals no delay is injected. The response of a system to such an input is depicted in FIG. 2 where, for sake of clarity, the variability in the mean response time is greatly reduced relative to the change in response time due to the delay injection. From FIG. 2 it is clear that the output signal during the measurement interval may be described by a signal $x_m^1 = \bar{r}_m t(l)$ that is present throughout the measurement interval, plus a signal $x_m^2$ of period $2 k_d$ having a magnitude of $A_d \nabla \bar{r} t_i$ for $k_d$ samples of each cycle and magnitude 0 for the other $k_d$ samples of each cycle. When performing a Discrete Fourier Transform on N samples (as taught below) the N samples encompass, $p=N/2$ $k_d$ periods of the signal $x_m^2$ of period $2 k_d$ samples, i.e., of the square-wave pattern of delay. In other words, the overall signal can be viewed as $X_m = X_m^2 + X_m^1$, whose Discrete Fourier Transform (DFT) is $$\mathcal{F}(k) = \sum_{m=0}^{N-1}(x_m^2 + x_m^1)e^{-j\frac{2\pi m}{N}k} \qquad (3)$$

$$= A_d \nabla \bar{r} t_i \sum_{m=0}^{p-1}\sum_{i=0}^{k_d-1} e^{-j\frac{2\pi(2k_d m+i)}{2k_d p}k} + \sum_{m=0}^{N-1} x_m^1 e^{-j\frac{2\pi m}{N}k}$$

$$= A_d \nabla \bar{r} t_i \left(\sum_{m=0}^{p-1} e^{-j\frac{2\pi(2k_d m)}{2k_d p}k}\right)\left(\sum_{i=0}^{k_d-1} e^{-j\frac{2\pi i}{2k_d p}k}\right) + \mathcal{F}^v(k)$$

$$= A_d \nabla \bar{r} t_i p \left(\sum_{i=0}^{k_d-1} e^{-j\frac{\pi i}{k_d p}k}\right) + \mathcal{F}^v(k)$$

Evaluating this transform at frequency $k=p$, (that is, at the frequency that corresponds to the number of periods of the square-wave pattern N samples that are processed with the DFT) it can be shown that the above reduces to $$\mathcal{F}(k)|_{k=p} = \frac{pA_d \nabla \bar{r} t_i}{2\sin\left(\frac{\pi}{2k_d}\right)} e^{-j\frac{\pi}{2k_d}} + \mathcal{F}^v(p)$$

from which $$|\nabla \bar{r} t_i| = \frac{|\mathcal{F}(p) + \mathcal{F}^v(p)|2\sin\left(\frac{\pi}{2k_d}\right)}{pA_d}.$$

Figure 3:
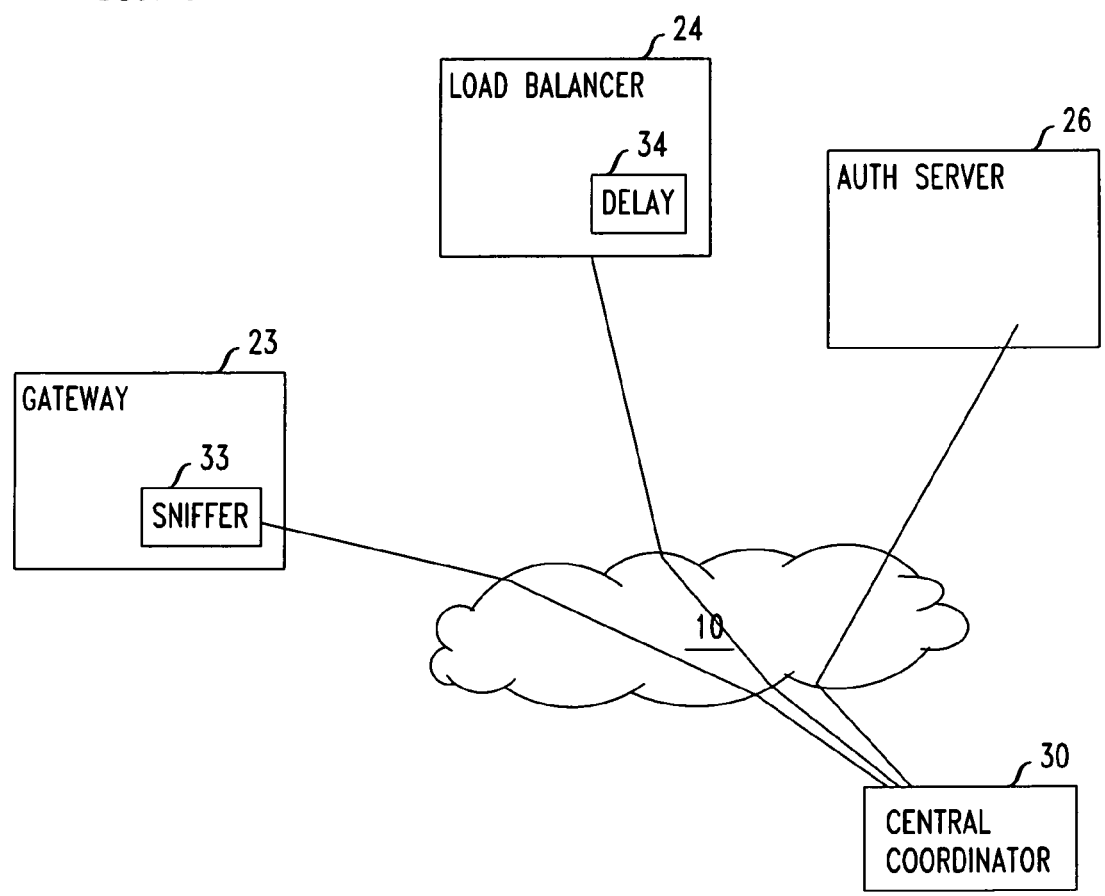
FIG. 3 depicts a structure that may be used to measure link latency gradient in the FIG. 1 system.

A structure that may be used to measure link latency gradient in the FIG. 1 system, for example the link between load balancer 24 and authentication server 26, is shown in FIG. 3. Sniffer daemon 33 at gateway 23 (to where all user requests to system 20 first arrive, collects incoming requests in accordance with a specification from central coordinator module 30. Illustratively, the specification may be to detect packets that request service A. The specification can also be to detect packets that request any service. Either continuously, or at specific intervals, or pursuant to a polling signal, sniffer 33 reports its findings to coordinator 30. Module 30 may reside in a separate server, or within any one of the other processors of system 20, for example, gateway 23. The information provided by sniffer 32 is sufficient for coordinator 30 to correlate a response (to the request that gave rise to the response) which eventually arrives at gateway 23.

When it is desired to measure the link latency gradient of the link from load balancer 24 to authentication server 26, in accord with the illustrative embodiment shown in FIG. 3 a delay injection module 34 is installed in balancer 24, and is instructed to detect packets that are destined to server 26 and to delay them in accord with the principles disclosed above; for example, with a square waver pattern. A delay according to a square wave pattern can be implemented using variety of conventional techniques. An illustrative implementation uses a kernel module that intercepts messages targeted to a specified link and delays them according to the square wave pattern. Note that the signal injection method should ensure message ordering is not changed during delay injection or when the injection ends since change in message order may cause the receiving component to change its behavior.

As indicated above, coordinator 30 controls sniffer 33 and delay module 32. It is also in charge of a training phase.

The training phase is used to estimate parameters such as the interval $\Delta T_s$ (discussed above), the magnitude $A_d$ of the delay injected into the system, and the frequency that the injected delay is designed to possess. It is assumed, of course, that the system's operation during the training phase is representative of the system's operation during the measurement phase.

To choose $\Delta T_s$, the coordinator records a mean $\Delta \bar{m}$ and a standard deviation s of the time interval between R consecutive requests. The sampling interval is then chosen, illustratively at $\Delta T_s = \bar{m} + 3\sigma$, to ensure that at least R points are averaged in each sampling interval with a high probability (the $3\sigma$ choice insures a probability of 0.999, if the time between k requests has a normal distribution). The parameter R that governs the number of data points per bin may be fixed, or provided by the party that performs the measurement.

To choose an appropriate magnitude and frequency component for delay injection, it is important to examine the frequency domain characteristics of the system's response time without perturbation because, though in the analysis above, for sake of simplicity and clarity, it was assumed that the system's response time without the perturbation has no significant amount of energy at any one frequency, it is possible that the assumption is not fully justified. To the extent that the assumption is not justified, the measurement accuracy suffers somewhat, but the choice of the delay signal described below mitigates the accuracy loss, if any. Specifically, during the training interval the coordinator captures the mean response times for M different chunks of N intervals $\Delta T_s$ (for example, M=9), where N is the number of sampling points used in each link latency gradient computation. Controller 30 then computes a the Discrete Fourier transform (i.e., $$\mathcal{F}^v(k) = \sum_{m=0}^{N-1} \bar{r}t(\vec{l})e^{-j\frac{2\pi m_k}{N}}),$$

of each of the M chunks and develops a mean, mean($\mathcal{F}^0(k)$), and a standard deviation, $\sigma(\mathcal{F}^0(k))$. The Fast Fourier Transform algorithm is often used to compute this transform, in which case N is limited to a power of 2. Note that both mean($\mathcal{F}^0(k)$) and $\sigma(\mathcal{F}^0(k))$ are functions of k.

We choose the delay magnitude to be proportional to the standard deviation; that is, $A_d = h \cdot \sigma(\mathcal{F}^0(k))$. In experiments performed in accord with the teachings herein, the delay scaling factor, h, was chosen to be 30. Also, we choose the $A_d$ that results from the minimum $\sigma(\mathcal{F}^0(k))$ from set of values at the different frequencies, and we choose the $k_d$ of the square wave pattern to equal the frequency that corresponds to that minimum $\sigma(\mathcal{F}^0(k))$.

The above discloses the principles of this invention in connection with the illustrative example where the sensitivity of a system's response to the latency of a link is measured. The principles of this invention are, however, broader than the illustrative example, and other applications, modifications and uses are possible without departing from the spirit and scope of this invention. To illustrates, the principles disclosed herein are applicable to the question of "how much can I slow down the CPU of a particular processor and save power, yet still satisfy the customer," or "how can I allocate resources among a plurality of virtual machines to be most responsive to customer needs."

Since a link gradient offers a measure of sensitivity of the end-to-end response time to a change in the latency of a link, it is a useful tool in application/system deployment planning and optimization. For example, a company that owns multiple data centers around the country or around the world could measure the link latencies between the different data centers and given the link gradients of a distributed application, the company could estimate the end-to-end response time of the application in different distributed deployments (i.e., spanning more than one data centers). Similarly, a company considering the use of a cloud computing provider to host (a part of) a distributed application, could predict the application's end-to-end response time using link gradients. For optimization, the link gradient can be used to identify which components should be located close to one another (low link latency). Finally, it can identify components that are good targets for code optimization since two components connected by a link with large gradient communicate repeatedly to serve one application request and it may be possible to optimize the interactions between these components and thus reduce the link gradient (as well as end-to-end response time).

The invention claimed is:

1. A method in a distributed system that includes a gateway that responds to service requests from client devices, which gateway is connected to plurality of a servers that each includes a network link through which the server assists said gateway in fulfilling at least one of said service requests, comprising:

injecting-a change in responsiveness of one of said servers; and quantitatively evaluating sensitivity of a responsiveness metric of said distributed system to said change;

wherein said metric is average delay (mean response time), computed over an interval $\Delta T_s$ of chosen duration, between submission of service requests to said gateway and receiving responses to said service requests;

said quantitatively evaluating is over a frame of N successive $\Delta T_s$ intervals, N being an integer, where duration of the $\Delta T_s$ interval is chosen to be no greater than required to encompass, with a probability of preselected value, at least one arriving service request, said injecting injects said change in said one of said servers in a periodic manner, with p periods occurring during said frame, where p is a chosen integer;

said quantitatively evaluating evaluates a sequence of values of said mean response times, to determine value of a frequency component of a chosen frequency bin in the sequence of mean response time values; and each period of said periodic manner of change consists of $k_d$ of said successive intervals during which no change is injected, and $k_d$ of said successive intervals during which a change of a given magnitude is injected; and said quantitatively evaluating evaluates $$\sum_{m=0}^{N-1} x_m e^{-j\frac{2\pi m}{N}v},$$

where $x_m$, m=0, 1, . . . N-1, is said sequence, and v is a integer that is chosen to equal p.

2. The method of claim 1 where said metric is limited to specified one or more types of said service requests.

* * * * *